United States Patent

[11] 3,622,315

[72] Inventors John W. Brookman
Saratoga;
John B. Murphy; Zack D. Reynolds, both of San Jose, all of Calif.
[21] Appl. No. 775,861
[22] Filed Nov. 14, 1968
[45] Patented Nov. 23, 1971
[73] Assignee International Business Machines Corporation
Armonk, N.Y.

[54] PHOTOERASABLE SCAN CONVERTER
14 Claims, 11 Drawing Figs.

[52] U.S. Cl. .......... 96/1 R, 178/6.6 A, 315/11, 315/12
[51] Int. Cl. .......... G03g, H04n 5/76, H01j 31/48
[50] Field of Search .......... 96/1, 1.5; 178/5.4, 7.2; 315/11, 12

[56] References Cited

UNITED STATES PATENTS

| | | | |
|---|---|---|---|
| 2,787,724 | 4/1957 | Webley | 315/12 |
| 3,011,089 | 11/1961 | Reynolds | 315/10 |
| 2,654,853 | 10/1953 | Weimer | 315/10 |
| 2,826,632 | 3/1958 | Weimer | 178/5.4 |
| 2,899,488 | 8/1959 | Kalzaian | 178/5.4 |
| 3,011,019 | 11/1961 | Rado | 178/7.1 |
| 3,405,309 | 10/1968 | Goetze et al. | 315/11 |

OTHER REFERENCES

J. B. Potter, On the Use of the Vidicon Camera Tube as A Video Storage Device, A.M.I.R.E. (Anst.) pp. 855- 864

*Primary Examiner*—George F. Lesmes
*Assistant Examiner*—M. B. Wittenberg
*Attorneys*—Hanifin and Jancin and Shelley M. Beckstrand

ABSTRACT: A photoerasable scan converter is described for converting digital and/or optical input to a raster signal output for storage in a buffer and subsequent monitoring. In combined image mode, a charge pattern representing a first image is painted on the photoconductive target of a Vidicon tube by an electron beam in directed-beam mode. A modification or modulation of a charge pattern representing a second image is provided on the target by exposing said screen to the second image through an optical system. The combined images, or charge patterns, are read out by electron beam scanning in raster mode. Any remanent charge on the target is erased by discharging with a short, high intensity flash of light. Similarly, a single image from either optical exposure or electron beam painting may be read out and erased.

INVENTORS.
JOHN W. BROOKMAN
JOHN B. MURPHY
ZACK D. REYNOLDS
BY Shelley Beckstrand
AGENT

PHOTOERASABLE SCAN CONVERTER

Reference is made to copending application, Ser. No. 782,154 filed Dec. 9, 1968, assigned to the same assignee as the present application for a video display system.

BACKGROUND OF THE INVENTION

The invention relates to an electron beam scan converter, wherein a TV camera tube, for example, is utilized to convert $x$, $y$ (position) and $z$ (intensity) information to TV raster or video information and for combining that $x$, $y$, and $z$ information with an optical image.

The standard TV camera tube of the prior art is optical read-in and electron beam readout. An example of such a tube is the vidicon. Such a tube is utilized by continuously exposing the photoconductive target to the optical image, which image may be changing with time, and scanning the target with an electron beam in raster mode. There is no erasure of the target between scan cycles, and thus there is no capacity for temporarily storing a single image on the target to permit the time sharing described in the referenced copending application, Ser. No. 782,154.

The scan converters of the prior art do not provide for optical input in addition to the electron beam input. Furthermore, the target erasure is relatively slow, precluding use of the converter in the time sharing mode described in the above referenced copending application, Ser. No. 782,154.

It is, therefore, an object of the invention to provide an improved scan converter utilizing a modified TV camera tube, such as the Vidicon.

It is a further object of the invention to provide a scan converter having optical input facility, for combining digital, or directed beam images, with optical images.

It is a further object of the invention to provide a scan converter having very rapid target erasure for permitting time sharing.

SUMMARY OF THE INVENTION

In the method of the invention, a target comprising a thin photoconductive layer in juxtaposition to a transparent conductive electrode is utilized for providing an output signal which represents an image, said image being an optical image, an electron beam image, or a combination of the optical and electron beam images. In anticipation of a write operation, the target is momentarily illuminated by a flash of high intensity light. That light causes the photoconductive layer to become conductive, charging the target surface of the photoconductive layer to the same potential as the conductive backing (electrode). During the write operation, in combined image mode, the target is exposed to an optical image, and a directed electron beam "paints" a computer generated electrostatic image on the target by charging elemental areas of the target as a function of the electrostatic target to cathode potential and the conductivity of the photoconductive layer. In single image mode, the target is either exposed or painted during the write operation. During the read operation, the electron beam is deflected over the target to produce an output displacement current at the target electrode connection, which current represents the exposed, painted, or combined images, as the case may be.

The foregoing and other objects, features, and advantages of the invention will be apparent from the following more particular description of preferred embodiments of the invention, as illustrated in the accompanying drawings.

DESCRIPTION

Figure 1:
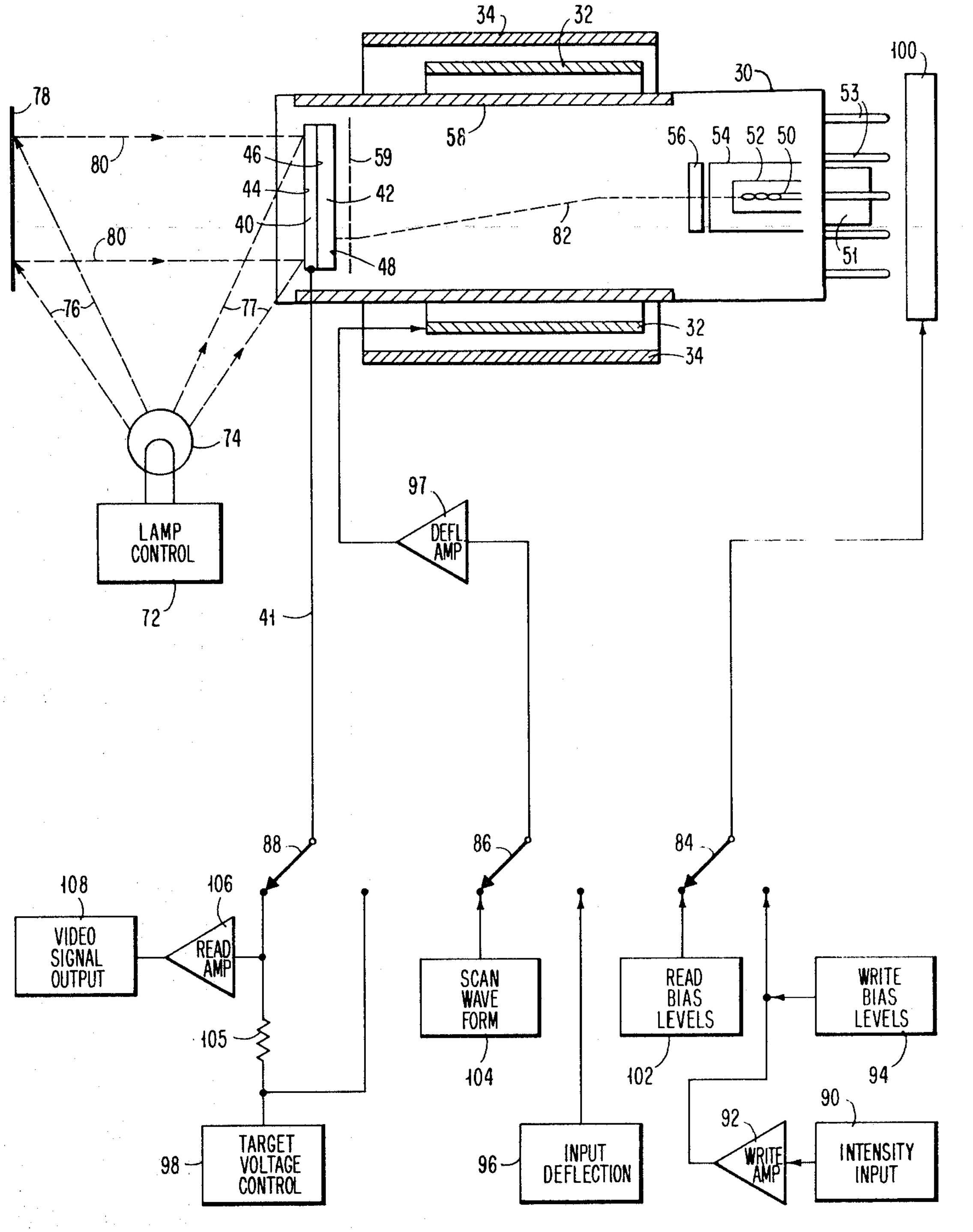
FIG. 1 is a block diagram of a scan converter constructed in accordance with the invention.

Referring now to FIG. 1, the structure of a TV camera tube for use in the invention will be described. Camera tube 30 comprises electron beam generating means, focusing and deflection means, and a photoconductive target with a transparent conductive target backing electrode.

The electron beam generating means comprises electron beam generator 54, including cathode 52 and heater 50. Accelerator 56 and decelerator mesh 59 control the velocity of the generated electron beam 82.

The focus and deflection means comprise focus coil 34 and deflection coil 32 for setting up the magnetic fields for deflecting electron beam 82 to the desired location. Wall electrode 58, consisting of a high resistivity material deposited on the inside glass surface of tube 30, reduces eddy currents with respect to wall electrodes used in common practice and also shields the electron beam from other outside influences. The more complicated interior wall electrodes of prior art TV camera tubes not only do not efficiently shield, but produce large eddy currents when magnetic deflection is used, thus causing distorted fields and nonrepeatable painted images. It should be understood that magnetic focus and deflection are not essential to tube operation; electrostatic or mixed electrostatic/magnetic electron deflection and control may be employed.

The target comprises a photoconductive layer 42 and a transparent target backing electrode 40. Surface 46 of photoconductive layer 42 is maintained at the potential of electrode 40. Electrons from electron beam 82 are deposited on surface 48 of the photoconductive layer 42 when painting an image in electrical write mode or scanning in read mode.

Electrical connections are made to the various elements of tube 30 through cathode electrode 51 and other electrodes 53.

Having described the structure of the TV camera tube for use in the invention, the control circuitry will next be described. That circuitry is by way of example only to illustrate the method of the invention.

Switches 84, 86 and 88 control the voltage levels and signals applied to the tube 30. In the read mode, these switches are set to the left position as shown in FIG. 1. In the write mode, they are set to the right position. In the write mode for painting a computer generated image on the target, write bias levels 94 and input intensity 90 through write amplifier 92 control the signals at the cathode 51 and other electrodes 53 through switch 84. Similarly, when in the write mode, input deflection 96 controls deflection coil 32 through switch 86 and deflection amplifier 97. Finally, in write mode, target electrode backing 44 is connected to voltage potential 98 through switch 88.

In the read mode, the voltages at the cathode 51 and other electrodes 53 are controlled by read bias level control 102 through switch 84. Similarly, deflection coil 32 is controlled by scan waveform generator 104 through deflection amplifier 97 and switch 86. Finally, in read mode, the video out signal 108 is obtained from the target electrode 40 through switch 88 and read amplifier 106. The input to read amplifier 106 is connected to voltage 98 through resistor 105.

The optical system for image exposure and for flash erase will next be described. Lamp 74 is controlled by lamp control 72. During erase flash, light 77 from lamp 74 illuminates the surface 44 of the transparent conductive backing 40 through an appropriate optical system not shown. In the optical input mode, light 76 from lamp 74 illuminates, for example, sheet 78. Reflected light 80 from sheet 78 illuminates the conductive backing 40 and target 42 through appropriate optics not shown. Of course, separate lamps 74 may be provided for erase and for optical input. Similarly, in the case of a transparent sheet 78, the lamp 74 may be positioned behind sheet 78 so that light 76 is refracted through sheet 78 to illuminate the target 42.

Referring further to FIG. 1, the general operation of the device of the invention will next be described for target erasure, image exposure and painting, and raster readout.

During erasure, the target 42 is illuminated with a short (less than 10 microseconds), high intensity (about 0.1 watt-sec) burst of light 77. The duty cycle and intensity vary, of course, with the photoconductive material used. The short duty cycle results in a low average radiant power flow and the high intensity reduces the resistivity recovery time of the photoconductive materials when the flash ceases, thus permitting rapid recovery of target dielectric characteristics. The target 42 becomes highly conductive, surface 48 acquires the same potential as surface 46, i.e., the potential of conductive backing electrode 40, and any previous electrostatic pattern on surface 48 is destroyed. After the erasing flash, the target 42 becomes nonconducting. It has been experimentally observed that this recovery of dielectric characteristics is in the order of one microsecond for several different TV camera tubes.

During the image painting (or directed-beam writing) operation, the electron beam 82 is deflected within the target area of tube 30. An electrostatic pattern is stored on surface 48 of target 42 by modulating the intensity of electron beam 82, modulating the cathode 52 to target 40 potential, or using both methods simultaneously. The writing period need not be constant, i.e., a pencil beam pattern generation will require a writing time that is a function of pattern complexity. Also, the input signal may be intermittent, if desired.

During optical image exposure, the image 80 of object 78 is focused by optics (not shown) on target 42. The object is illuminated by light 76 from lamp 74, the intensity and duration of light 76 being controlled by lamp control 72. As will be more fully explained, the optical exposure step may take place at various steps in the method, such as before, during, or after the painting of the computer generated image, and before or during the raster scan step for readout.

During readout, the electron beam 82 is again deflected over the target 42 at a speed and with a scanning format which is synchronized to other output subsystem devices, as is more fully explained in the cross reference, Ser. No. 782,154. The electron beam 82 tends to charge each target area of target 42 toward cathode 52 potential; and, thereby, it differentially charges elemental areas of the target 42 as a function of the stored electrostatic target 40 to cathode 52 potential on each elemental area. This charging operation produces a displacement current in the target electrode 40 which is detected at video signal output 108. One readout sweep does not completely equalize the surface 48 to cathode 52 potential as a result of typical TV camera tube lag and several successive sweeps of beam 82 are required by prior art devices to erase or reduce previous field modulation to an acceptable minimum. As previously discussed, the flash erase step of the invention completely erases between television fields.

Optimal operation of the photoerasable scan converter of the invention can be achieved by using different write in and readout beam currents or by using different cathode to target potentials for write in (painting) and readout (scanning). Each of these techniques will be discussed below.

A single current for both write in and readout operation involves a compromise between parameters resulting in poor resolution and balance. By writing at one current and reading at another, a high contrast charge pattern may be stored on surface 48 while beam 82 spread effects, such as readout portions of two adjacent scan lines in a field interlaced television format, can be minimized. Resolution and balance between signals from alternate TV fields are thereby improved.

In the second technique for providing optimal operation of the photoerasable scan converter, different cathode 52 to target 40 potentials are utilized for write in (painting) and readout. Thus, the effective target sensitivity of target 42 can be adjusted during the write cycle so that the magnitude of the stored pattern potentials across target 42 can be controlled. During readout, the depth of modulation control between pattern potential and the average target potential can be adjusted to minimize beam 82 displacement due to pattern produced fields. Generally, during either write in or readout, the target 42 must be positive with respect to cathode 52 but less than 50 volts, depending on the target 42 material, to avoid excessive secondary emissions. Thus, for a given TV camera tube, the target 40 to cathode 52 potential during write in operation may be about 30 volts, and about 10 volts for the readout operation depending upon the optimum operating potentials for that tube. The function of write bias levels control 94, intensity input control 90 and target voltage control 98 is to obtain optimal operation by programming the target 40 to cathode 52 voltage and the beam 82 current. These voltages and currents are also varied during write in to get various shades of gray, as more fully explained below.

As is known to those skilled in the art, the charge distribution on surface 48 of photoconductive layer 42 and the resulting signal at video signal output 108 during raster scan output, is a function of the light intensity of image 80, the cathode 52 to electrode 40 potential, and the electron deposition time. Thus, the electrical conductivity of target 42 varies in accordance with the white, gray, and black tones of object 78. Similarly write bias levels 94, intensity input 90, and target voltage control 98 control the rate of deposition of electrons on surface 48, electron beam 82. Thus, referring to FIG. 3B, for example, the charge density on surface 48 of elemental area 42 and the resulting current output during raster scan, may be made dependent upon the intensity of light 80*f*, the energy of beam 82*f*, and the time of deposition of beam 82*f*. Generally, as light 80*f* is made less intense, elemental area 42*f* becomes less conductive, and a given beam energy and deposition time for electron beam 82*f* will result in the deposition of a higher negative charge on surface 48. Similarly, for a given light intensity 80*f*, the negative charge deposited on surface 48 of elemental area 42*f* may be increased by increasing the energy or deposition time of beam 82*f*.

Of course, the above described gray tone capability of the invention is necessary to combine two overlapping images each of which is recognizable at the monitor.

The method of the invention contemplates the combining of an optical image and an electron beam image on target 42 for temporary storage and subsequent readout to a buffer and thence to a visual monitor. Reference is made to copending application Ser. No. 782,154, assigned to the same assignee as the present application for a video display system incorporating the scan converter of the invention.

Before proceeding to a detailed analysis of the operation of the device for combining the exposed and painted images on target 42, the operation of the device will first be explained for an electron beam (painted) image and then explained for just an optical (exposed) image.

Referring to FIG. 1, an electrostatic charge pattern is painted by beam 82 on surface 48 of photoconductive target 42 according to the following process. Photoconductive target 42 is first illuminated with a flash of light 77 from lamp 74. Under this high intensity illumination, photoconductive layer 42 becomes highly conductive, resulting in surface 48 assuming the same potential as transparent conductive backing 40. With switches 84, 86, and 88 set to the right-hand position as viewed in FIG. 1, the photoerasable scan converter is in the write mode. With target 42 maintained in darkness, it is nonconductive. Target backing electrode 40 is maintained at relatively high voltage (e.g. 30v) through switch 88 by target voltage control 98. In accordance with the computer program, write levels 94, intensity input 90 and input deflection 96 control the electron beam 82 so as to paint the desired image on target 42. Inasmuch as the photoconductive target 42 is nonconductive, a charge of electrons is deposited on surface 48.

Said charge may be temporarily stored on surface 48 of target 42 for a period of time, which period of time is a function of the vacuum, darkness, temperature, etc., in the Vidicon tube 30 and a function of the characteristics of the photoconductor 42.

With switches 84, 86, and 88 set to the left-hand position as viewed in FIG. 1, the scan converter is in the read mode. The target backing electrode 40 is maintained at a voltage controlled by target voltage control 98 through switch 88 and resistor 105. It is preferred that this voltage be less than the voltage applied to target electrode 40 during the write process. In accordance with the computer program, scan waveform control 104 and read bias level control 102 cause the electron beam 82 to scan the target 42 in., for example, a raster mode. The video output signal at 108 is a function of the capacitive displacement current of photoconductive layer 42 during the raster scan. As is known by those skilled in the art, a higher voltage appears at 108 when the electron beam 82 deposits electrons on those portions of surface 48 which were not previously negatively charged. Finally, target 42 is flash illuminated by lamp 74 to discharge any remanent charge on surface 48 to complete the cycle.

Two alternate techniques will now be described for establishing an electrostatic charge pattern on target 42 from an image 80 and providing an output signal representing said image. In the first technique, the first step is erasing any prior charge distribution on surface 48 of target 42 by illuminating the target 42 with a high intensity flash 77 from lamp 74. The next step is simultaneously illuminating target 42 with the optical image 80 and scanning the target 42 with electron beam 82 in raster mode. In those areas where target 42 is illuminated with light from image 80, said target will be conductive. On the other hand, target 42 will not be conductive in those areas where the image 80 is dark, and no light reaches the target 42. As the electron beam sweeps across those areas of target 42 which are illuminated, the electrons charge elemental areas of capacity with leakage giving a combined conduction and displacement current resulting in an output at video signal output 108. On the other hand, as electron beam 82 sweeps those portions of target 42 which are not illuminated, conduction is minimal and electrons are deposited on surface 48 of target 42; there is less current output at video signal output 108. In the manner described, readout is simultaneous with exposure of the target 42. Readout can also be accomplished after exposure during a first electron beam sweep by detecting video during a second, delayed electron beam sweep.

The second technique for establishing a charge pattern on target 42 representative of an optical image and providing an output at video signal output 108 representative of that image will next be described. The target 42 is erased of any previous charge on surface 48 by illuminating said target 42 with a flash of high intensity light 77 from lamp 74. Next, the photoconductive target 42 is primed by raster scanning said target 42 with electron beam 82, thereby uniformly depositing electrons on surface 48 and charging the photoconductor 42. Next, the target 42 is momentarily exposed to image 80 from object 78. During this exposure, the white areas of the image illuminate the photoconductor 42 causing the previously deposited electrons to discharge. No such discharge occurs in those areas of the photoconductor where the dark areas of image 80 are focused. Finally, the output is provided at video signal output 108 by raster scanning, or sweeping, target 42 with electron beam 82.

Having described three techniques for establishing a charge pattern representative of an image from either an optical or electron beam source, two preferred methods for combining two images, one from an optical source and the other from an electron beam source, will next be described. First, however, the manner of interpreting FIGS. 2A–2E and 3A–3C will be described. Referring to FIGS. 2A through 2E, for the purpose of the following discussion, photoconductive target 42 is shown divided into elemental areas 42*a* through 42*i*. Similarly, light input 77 and 80 is portrayed in terms of light impinging on the elemental areas 42*a* through 42*i*. Thus, for example, the presence of arrow 77*a* indicates that light from flash 77 impinges on elemental area 42*a*. Similarly, the presence of an arrow 80*c* indicates that light from image 80 impinges upon elemental area 42*c*. On the other hand, the absence in FIG. 2C of an arrow at 80*g* indicates that no light impinges upon elemental area 42*g*. Similarly, the electron beam 82 is broken down into beams 82*a* through 82*i*. The presence of a beam 82*a*, for example, in FIG. 2B, indicates that during the electron scan, electrons were deposited upon the surface 48 of elemental area 42*a*. On the other hand, referring to FIG. 2D, the absence of an electron beam at 82*d* indicates that during electron beam scan there were no electrons deposited on the surface of elemental area 42*d*. Immediately to the right of each elemental area 42*a* through 42*i* is a circle. Within each circle is a "0," "-," "=,"or"≡".These refer to the relative charge on surface 48 of the respective elemental area with respect to surface 46. A "0" thus means that surface 48 is at electrode 40 potential while " -" means that surface 48 is at a lower potential, "=" is still lower,and"≡"approaches cathode potential (which may be at ground potential, for example). These signs refer to conditions at the conclusion of the operation described in the respective figures.

Figure 2A:
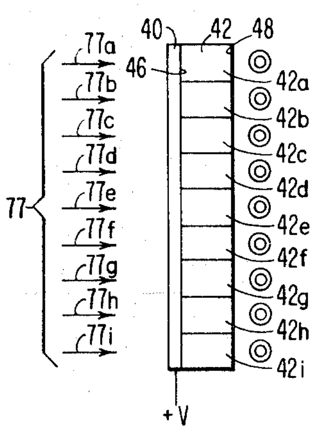
FIGS. 2A–2E describe the charge distribution on the target at various steps in a preferred embodiment of the process of the invention.
Figure 2B:
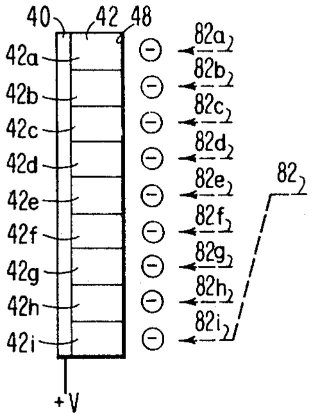

Referring now to FIG. 2A through 2B, a first preferred embodiment for combining two signals representative of two images on a layer of photoconductive material and subsequently providing an output signal representing a composite of said two images will be described. The first step is to illuminate each elemental area 42*a* through 42*i* of photoconductive layer 42 with a high intensity flash 77. The effect of this flash is to erase any remanent charge on surface 48 of layer 42 and bring said surface 48 to the voltage level of conductive backing 40.

Referring now to FIG. 2B, the next step in the process is to prime the surface 48 of the prime of the photoconductor target 42 by scanning said target with electron beam 82 in a raster mode such that a negative charge relative to conductive backing 40 is established at the surface 48 of each elemental area 42*a* through 42*i*.

Figure 2C:
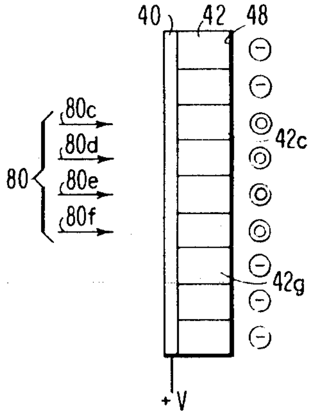

Referring now to FIG. 2C, the next step of the process is to expose the photoconductor target 42 to the optical image 80. Those elemental areas 42*c* through 42*f* exposed to light 80*c* through 80*f* are made conductive, resulting in surface 48 of said elemental areas 42*c* through 42*f* being raised to the positive voltage level of the conductive backing 40. The dark areas of the image 80 focused on elemental areas 42*a*, 42*b*, and 42*g* through 42*i* are not conductive and retain the charge deposited by the electron beam scanning described in connection with FIG. 2B. It should be recognized that the same resulting charge pattern can be produced by simultaneously scanning with a prime beam 82 and exposing target 42 to optical image 80.

Figure 2D:
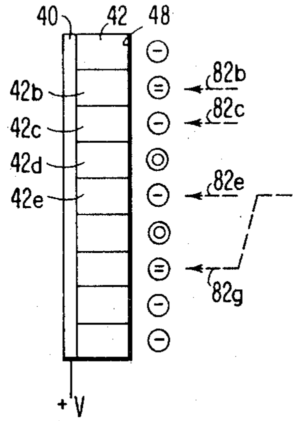

Referring now to FIG. 2D, the next step of the process is to electron beam scan a second image onto the target 42. In accordance with the computer program or other source of image forming signals such as a TV camera, the electron beam 82 is controlled so as to deposit electrons on elemental areas 42*b*, 42*c*, 42*e*, and 42*g*. As the electron beam 82*b* and 82*g* scans those elemental areas which were not exposed by light from image 80 and thus retain the negative charge (with respect to electrode 40) from the priming cycle, the negative charge on surface 48 of said elemental areas 82*b* and 82*g* increases as a function of beam intensity, voltage, and time. As electron beam 82*c* and 82*e* scan elemental areas 42*c* and 42*e* which were previously exposed to light from image 80, surface 48 of said elemental areas 42*c* and 42*e* are recharged to a negative potential with respect to electrode 40. The resulting electrostatic charge on surface 48 of photoconductor target 42 thus combine the optical and electron beam images.

Figure 2E:
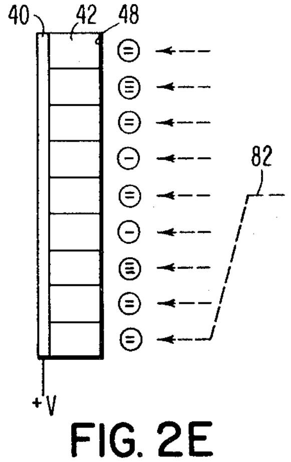
Figure 2F:
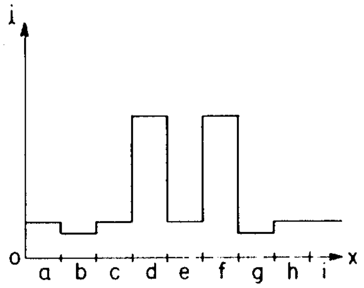
FIG. 2F is a chart describing the current output from the raster scan of FIG. 2E.

Referring finally to FIG. 2E, the final step is to scan each elemental area with electron beam 82 in raster mode. Referring to FIG. 2F, the current output appearing at the target output 41 resulting from the output scanning of FIG. 2, is shown. The vertical axis represents the current (not necessarily a linear scale), and the horizontal axis represents the elemental area being scanned. As electron beam 82 scans from the top to the bottom of FIG. 2E from elemental area 42*a* to area 42*i*, the current output approximates that shown in FIG. 2F. The maximum current output occurs as the electron beam 82 scans elemental areas 42*d* and 42*f*, which elemental areas had previously been exposed to light from image 80 and had not been scanned by electron beam 82 during the write operation of FIG. 2D. The minimum current output occurs as the electron beam 82 scans elemental area 42*b* and 42*g*, which elemental areas had not been exposed to light from image 80 and had been scanned by the electron beam during the write operation of FIG. 2D.

Figure 3A:
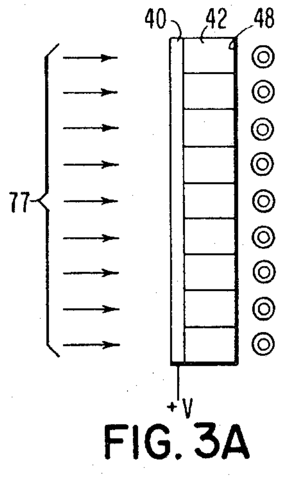
FIGS. 3A–3C describe the charge distribution on the target at various steps in a second preferred embodiment of the process of the invention.
Figure 3B:
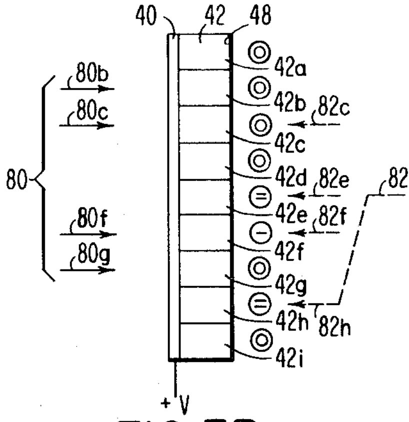
Figure 3C:
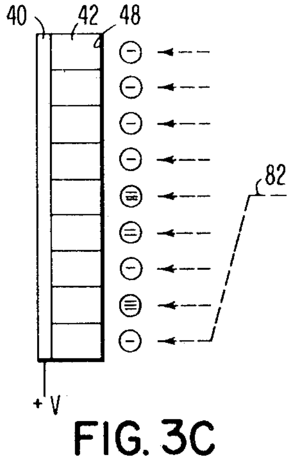

Referring now to FIGS. 3A through 3C, the second preferred embodiment for combining two signals representative of two images on a layer of photoconductive material and for providing an output signal representing a composite of said two images will be described.

Referring to FIG. 3A, the first step in the process is to uniformly illuminate photoconductive target 42 with a high intensity flash of light 77. With photoconductive layer 42 thus illuminated, said layer becomes highly conductive, resulting in the surface 48 of layer 42 being charged to the potential of conductive backing 40.

Referring now to FIG. 3B, the next step in the process is to simultaneously expose the target 42 to optical image 80 and electron beam paint the image 82*c*, 82*e*, and 82*h*. It should be recognized that the same resulting charge pattern can be obtained by electron beam painting immediately after flash erasure, followed by exposure of target 42 to optical image 80. Referring to elemental area 42*f*, a slightly negative charge on surface 48 with respect to electrode 40 is shown resulting even though area 42*f* is illuminated by light 80*f* in order to illustrate the gray scale capabilities described previously.

Figure 3D:
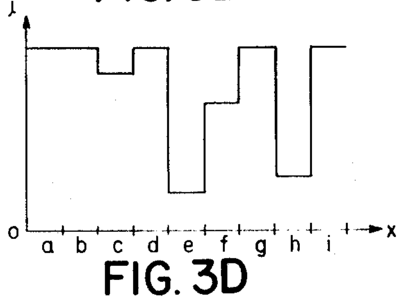
FIG. 3D is a chart describing the current output from the raster scan of FIG. 3C.

Referring finally to FIG. 3C, the output signal is provided by scanning the target 42 with electron beam 82 in raster mode. FIG. 3D, for example, is the current output at video signal output 108 during the raster scan step described with respect to FIG. 3C. In general, a high current output is expected as electron beam 82 scans those elemental areas retaining the positive potential of electrode 40 resulting from the high intensity electron beam flash 77 of FIG. 3A: i.e., elemental areas 42*a*, 42*d*, and 42*i*. Similarly, a high current output is expected from those elemental areas exposed to optical image 80 and not accessed by electron beam 82: i.e., elemental areas 42*b*, and 42*g*. Also, generally, the lowest current outputs are expected during the electron beam scanning readout of those elemental areas accessed by electron beam 82 in the write mode of FIG. 3B and not subjected to light from image 80: i.e., elemental areas 42*e* and 42*h*. Inasmuch as areas 42*e* and 42*h* were not exposed to light from image 80 as electron 82*e* accessed said element, a negative charge relative to electrode 40 was built up on surface 48. As the elemental areas 42*e* and 42*h* were scanned by electron beam 82 during readout, the negative charge from the write operation of FIG. 3B prevented further significant buildup of negative charge necessary for high capacitive current output at video signal output 108.

Referring further to FIG. 3D, generally an intermediate current output is expected at target output 41 as electron beam 82 scans in output mode those elemental areas, such as 42*c* and 42*f*, where electron beam 82*c* and 82*f* attempt to deposit electrons on surface 48 of those elemental areas made conductive by light 80*c* *and 80f* from image 80. Once again, the different current outputs shown for elemental areas 42*c* and 42*f* during the electron beams scanned in raster mode, illustrates the shades of gray obtainable by varying beam 82 intensity and deposition time, and/or image 42 light intensity or exposure time.

The actual charge voltages which reside on surface 48 of elemental areas 42*a* through 42*i* with respect to electrode 40 are, of course, not quantitized to the few possible values used for illustration, but their magnitudes may lie within a continuous range between the voltage of the electrode 40 and the cathode 52 potential during the time of electron deposition.

While the invention has been particularly shown and described with reference to preferred embodiments thereof, it will be understood by those skilled in the art that various changes in form and detail may be made therein without departing from the spirit and scope of the invention.

What is claimed is:

1. A method for combining two signals representative of two images on a layer of photoconductive material to subsequently provide an output signal representing a composite of said two signals comprising the steps of:
   exposing said photoconductive material to a high intensity flash of light,
   simultaneously optically exposing said layer to a light source representing a first image and electron beam painting in directed beam mode a charge pattern on selected elemental areas of said layer representing a second image, and
   raster scanning said layer with said electron beam for generating an output displacement current, said output representing a composite of said first and said second images.

2. The method of claim 1 wherein the optical image is retained on the photoconductive layer during the output scanning.

3. The method of claim 1 wherein the electron beam voltage for painting the charge pattern representing the second image is greater than the electron beam voltage for output scanning the composite charge patterns.

4. The method of claim 1 where the beam intensity and deposition time, and image light intensity and exposure time are controlled to provide a composite image having various shades of gray.

5. A method for combining two signals representative of two images on a layer of photoconductive material to subsequently provide an output signal representing a composite of said two signals comprising the steps of:
   exposing said photoconductive material to a high intensity flash of light,
   electron beam painting in directed beam mode a charge pattern on selected elemental areas of said layer representing a first image,
   optically exposing said layer to a light source representing a second image, and
   scanning said layer with said electron beam for generating an output displacement current, said output representing a composite of said first and said second images.

6. The method of claim 5 wherein the optical image is retained on the photoconductive layer during the output scanning.

7. The method of claim 5 wherein the electron beam voltage for painting the charge pattern representing the second image is greater than the electron beam voltage for output scanning the composite charge patterns.

8. The method of claim 5 where the beam intensity and deposition time, and image light intensity and exposure time are controlled to provide a composite image having various shades of gray.

9. A method for combining two signals representative of two images on a layer of photoconductive material for providing an output signal representing a composite of said two images comprising the steps of:
   exposing said photoconductive material to a high intensity flash of light,
   electron beam scanning in raster mode said photoconductive material to provide a uniform negative charge on the surface of said photoconductive material,
   flash exposing said photoconductive material to an optical image representative of a first image,
   electron beam painting in directed beam mode a charge pattern on selected elemental areas of said photoconductive layer representing a second image, and 10. The method of claim 9 wherein the electron beam voltage for painting the charge pattern representing the second image is greater than the electron beam voltage for output scanning the composite charge patterns.

11. The method of claim 9 where the beam intensity and deposition time, and the light intensity and exposure time are controlled to provide a composite image having various shades of gray.

12. A method for combining two signals representative of two images on a layer of photoconductive material for providing an output signal representing a composite of said two images comprising the steps of:

exposing said photoconductive material to a high intensity flash of light, electron beam scanning in raster mode said photoconductive material to provide a uniform negative charge on the surface of said photoconductive material, simultaneously exposing said photoconductive layer to an optical image representative of a first image and electron beam painting in directed beam mode a charge pattern on selected elemental areas of said photoconductive layer representing a second image, and scanning said layer with said electron beam, providing an output signal representing a composite of said first and said second images.

13. The method of claim 12 wherein the electron beam voltage for painting the charge pattern representing the second image is greater than the electron beam voltage for output scanning the composite charge patterns.

14. The method of claim 12 where the beam intensity and deposition time, and the light intensity and exposure time are controlled to provide a composite image having various shades of gray.

* * * * *

PO-1050
(5/69)

UNITED STATES PATENT OFFICE
CERTIFICATE OF CORRECTION

Patent No. 3,622,315 Dated November 23, 1971

Inventor(s) John W. Brookman, John B. Murphy, Zack D. Reynolds

It is certified that error appears in the above-identified patent and that said Letters Patent are hereby corrected as shown below:

This line was omitted from Claim 9, beginning at line 76:

scanning said layer with said electron beam, providing an output signal representing a composite of said first and said second images.

Signed and sealed this 25th day of April 1972.

(SEAL)
Attest:

EDWARD M.FLETCHER,JR.
Attesting Officer

ROBERT GOTTSCHALK
Commissioner of Patents